United States Patent
Jo et al.

(10) Patent No.: US 7,194,058 B2
(45) Date of Patent: Mar. 20, 2007

(54) APPARATUS AND METHOD FOR GENERATING TRANSMISSION AND RECEPTION LOCAL OSCILLATION SIGNALS IN A MOBILE TERMINAL

(75) Inventors: Kang-Hyun Jo, Seoul (KR); Kyung-Min Lee, Seoul (KR)

(73) Assignee: Samsung Electronics Co., Ltd. (KR)

(*) Notice: Subject to any disclaimer, the term of this patent is extended or adjusted under 35 U.S.C. 154(b) by 684 days.

(21) Appl. No.: 09/966,507

(22) Filed: Sep. 28, 2001

(65) Prior Publication Data
US 2002/0071511 A1    Jun. 13, 2002

(30) Foreign Application Priority Data
Oct. 19, 2000   (KR) .................. 10-2000-0061478

(51) Int. Cl.
    *H03D 3/24* (2006.01)
(52) U.S. Cl. .................. 375/376; 375/373; 455/260
(58) Field of Classification Search ............. 375/215, 375/354, 376, 373, 327, 294; 327/147, 156; 455/180.3, 260
See application file for complete search history.

(56) References Cited

U.S. PATENT DOCUMENTS

| | | | |
|---|---|---|---|
| 5,448,763 A * | 9/1995 | Gillig | 455/76 |
| 5,497,126 A * | 3/1996 | Kosiec et al. | 331/1 A |
| 5,764,648 A * | 6/1998 | Yamane et al. | 370/516 |
| 5,838,202 A * | 11/1998 | Kosiec et al. | 331/1 A |
| 5,950,115 A * | 9/1999 | Momtaz et al. | 455/73 |
| 6,185,411 B1 * | 2/2001 | Gillig et al. | 455/260 |
| 6,327,319 B1 * | 12/2001 | Hietala et al. | 375/374 |

FOREIGN PATENT DOCUMENTS

| | | |
|---|---|---|
| EP | 0 693 835 | 1/1996 |
| JP | 09205394 A * | 8/1997 |

* cited by examiner

Primary Examiner—Temesghen Ghebretinsae
Assistant Examiner—Juan Alberto Torres
(74) Attorney, Agent, or Firm—The Farrell Law Firm

(57) ABSTRACT

There is provided an apparatus for generating a transmission of local oscillation signals and a reception of local oscillation signals in a mobile terminal. The apparatus includes: a first phase locked loop (PLL) block configured to generate a transmission local oscillation signal; a second PLL block configured to generate a reception local oscillation signal; and a controller configured to control the first PLL block to operate before a minimum time period required for the first PLL block to lock up from a start point of a transmission burst period and the second PLL block to operate before a minimum time period required for the second PLL block to lock up from a start point of a reception burst period.

6 Claims, 5 Drawing Sheets

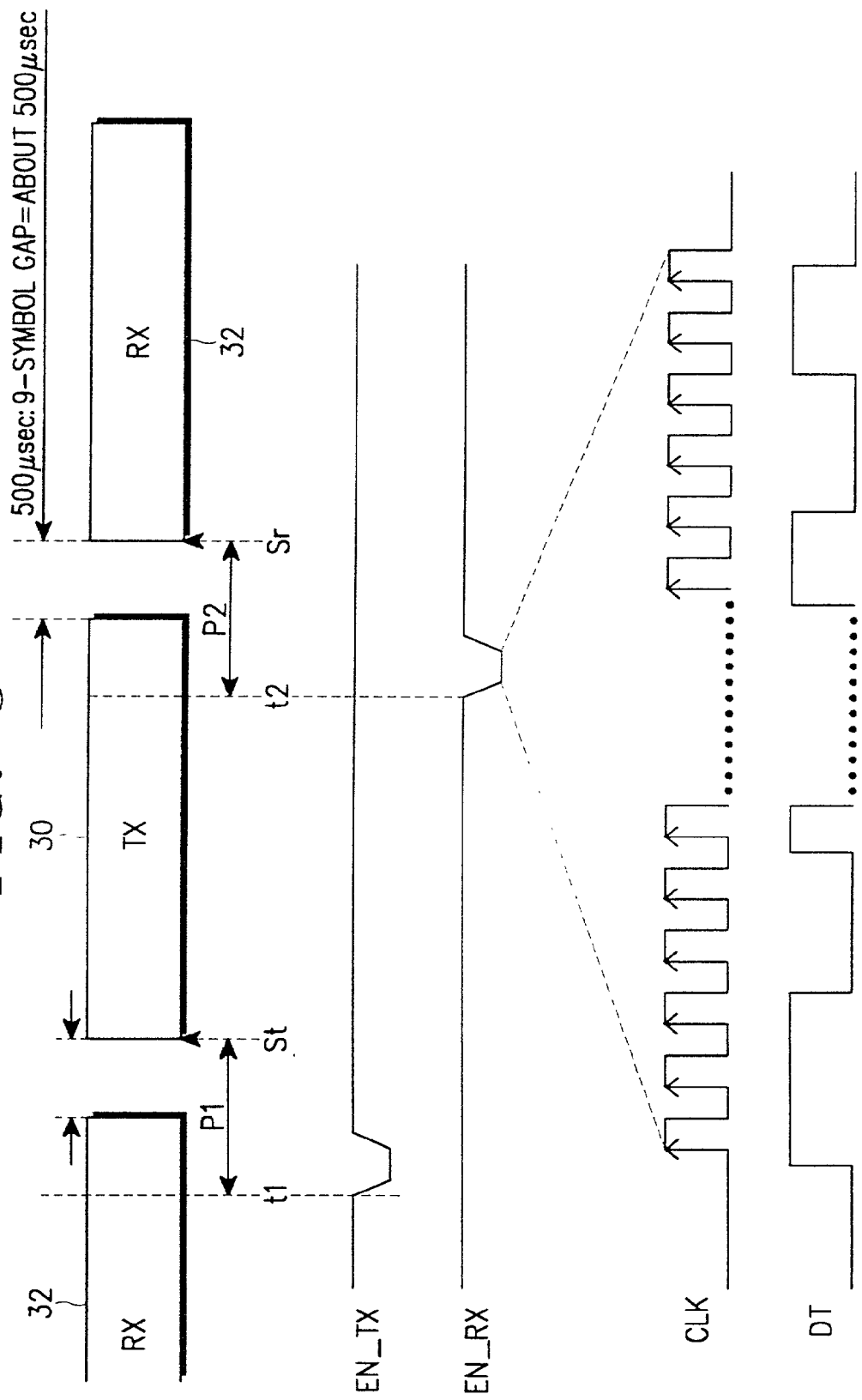

APPARATUS AND METHOD FOR GENERATING TRANSMISSION AND RECEPTION LOCAL OSCILLATION SIGNALS IN A MOBILE TERMINAL

PRIORITY

This application claims priority to an application entitled "Apparatus and Method for Generating Transmission and Reception Local Oscillation Signals in Mobile Terminal" filed in the Korean Industrial Property Office on Oct. 19, 2000 and assigned Ser. No. 2000-61478, the contents of which are hereby incorporated by reference.

BACKGROUND OF THE INVENTION

1. Field of the Invention

The present invention relates generally to a mobile terminal, and in particular, to an apparatus and method for generating transmission and reception local oscillation signals.

2. Description of the Related Art

In a mobile terminal, a local oscillation signal for transmission (TX local oscillation signal) is used to upconvert the frequency of a transmission signal, whereas a local oscillation signal for reception (RX local oscillation signal) is used to downconvert the frequency of a received signal. The TX and RX local oscillation signals are generated by a PLL (Phase Locked Loop) block and provided to a radio transmitter and a radio receiver, respectively.

In a conventional TDD (Time Division Duplex) mobile terminal, a TX local oscillation signal and an RX local oscillation signal are selectively provided by a PLL block 8 as shown in FIG. 1. The PLL block 8 synchronizes the frequency and phase of its output signal to those of a reference signal or an input signal.

Referring to FIG. 1, the PLL block 8 is comprised of a frequency synthesizer 2, a low pass filter (LPF) 4, and a voltage controlled oscillator (VCO) 6. A controller (not shown) feeds an enable signal EN, data DT, a clock signal CLK to the frequency synthesizer 2 of the PLL block 8, so that the PLL block 8 may selectively provide: a TX local oscillation signal (TX LO) to a radio transmitter in a transmission mode, and an RX local oscillation signal (RX LO), to a radio receiver in a reception mode. The data DT controls values for the TX and RX local oscillation signals. The frequency synthesizer 2 receives the data DT, in an active logic low state of the enable signal EN, in response to the clock signal CLK. The frequency synthesizer 2 generates a signal with a very stable frequency, by synthesizing a signal of a reference signal source received from a reference signal generator, based on the data DT. The LPF 4 filters the signal received from the frequency synthesizer 2 and provides a voltage value corresponding to the filtered signal to the VCO 6. The VCO 6 generates a signal with an oscillation frequency corresponding to the voltage value, that is, TX LO or RX LO. TX LO and RX LO are provided to the radio transmitter and the radio receiver, respectively. Then the TX and RX oscillation signals are fed back to the frequency synthesizer 2 at the same time.

It is possible to selectively generate a TX local oscillation signal and an RX local oscillation signal using the single PLL block 8 in the conventional TDD mobile terminal for the following reason. The TDD mobile terminal has a frame structure as shown in FIG. 2. Referring to FIG. 2, the frame is a GSM (Global System for Mobile telecommunication) TDMA (Time Division Multiple Access) frame. Each GSM TDMA frame is 4.615 ms in duration and has a gap of about 1.154 ms between a TX burst period and an RX burst period. The 1.154 ms gap is sufficient for the PLL block 8 to secure a time required to switch frequencies from TX LO, and RX LO, local oscillation signals (hereinafter, referred to as "PLL lock-up time" or "frequency switching time"). Therefore, the TDD mobile terminal can generate TX LO in a transmission mode and RX LO in a reception mode by use of the single PLL block 8.

However, a propagation delay that occurs in a multi-time slot mode, between a mobile terminal, or between a mobile terminal and a base station must be considered when multi-slot standards are supported as in HSCSD (High-Speed Circuit Switched Data) and GRS (General Radio Service), or a satellite-based TDD scheme is employed.

The conventional mobile communication system does not need a short PLL lock-up time because it mainly provides voice transmission. On the contrary, future mobile communication systems will be configured to additionally provide transmission of pictures and data communication. For the resulting use of multi-time slots in a TDMA frame, the PLL lock-up time should be reduced. However, the conventional method shown in FIG. 1 has limitations in reducing the PLL lock-up time because as the PLL lock-up time decreases, the phase noise performance of the PLL block deteriorates.

Therefore, there exists a need for an apparatus and a method that provides a shorter frequency switching time, or a shorter PLL lock-up time, which allows the PLL block to provide a transmission of pictures and data communication.

SUMMARY OF THE INVENTION

It is, therefore, an object of the present invention to provide an apparatus for generating local oscillation signals for transmission and reception in a mobile terminal that exchanges voice, images, and data.

It is another object of the present invention to provide a method for switching frequencies between a transmission of a local oscillation signal and a reception of a second local oscillation signal even though the gap between a transmission burst period and a reception burst period is short in a mobile terminal.

To achieve the above objects, there is provided an apparatus for generating a transmission of a local oscillation signal and a reception of a second local oscillation signal in a mobile terminal, the apparatus comprising: a first phase locked loop (PLL) block configured to generate a transmission of a local oscillation signal; a second PLL block configured to generate a reception of a local oscillation signal; and a controller configured to control the first PLL block to operate before a minimum time period required for the first PLL block to lock up from a start point of a transmission burst period and the second PLL block to operate before a minimum time period required for the second PLL block to lock up from a start point of a reception burst period.

BRIEF DESCRIPTION OF THE DRAWINGS

The above and other objects, features and advantages of the present invention will become more apparent from the following detailed description when taken in conjunction with the accompanying drawings in which:

FIG. 5 is an operational timing diagram, according to the embodiment of the present invention.

DETAILED DESCRIPTION OF THE PREFERRED EMBODIMENTS

Preferred embodiments of the present invention will be described hereinbelow with reference to the accompanying drawings. In the following description, well-known functions or constructions are not described in detail since they would obscure the invention in unnecessary detail.

Figure 3:
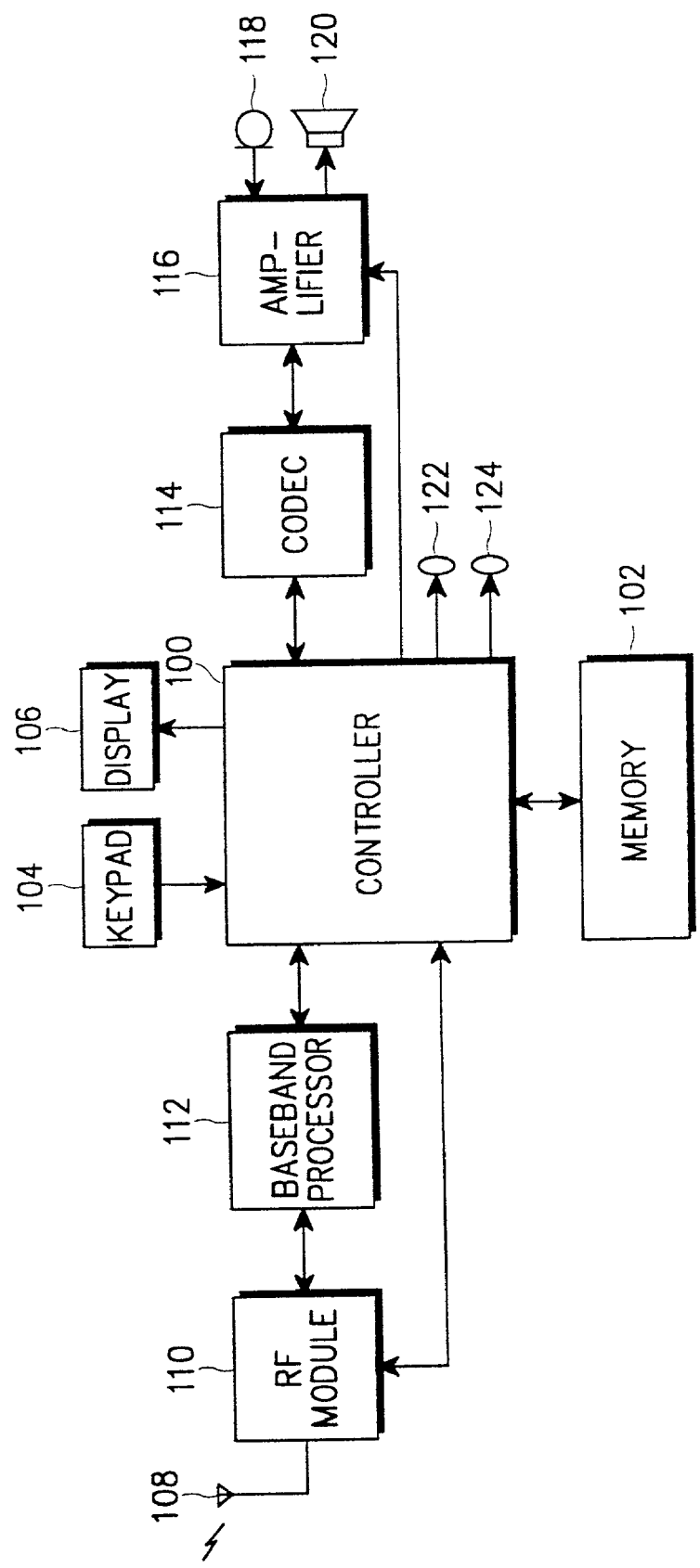
FIG. 3 is a block diagram of a typical mobile terminal.
Figure 4:
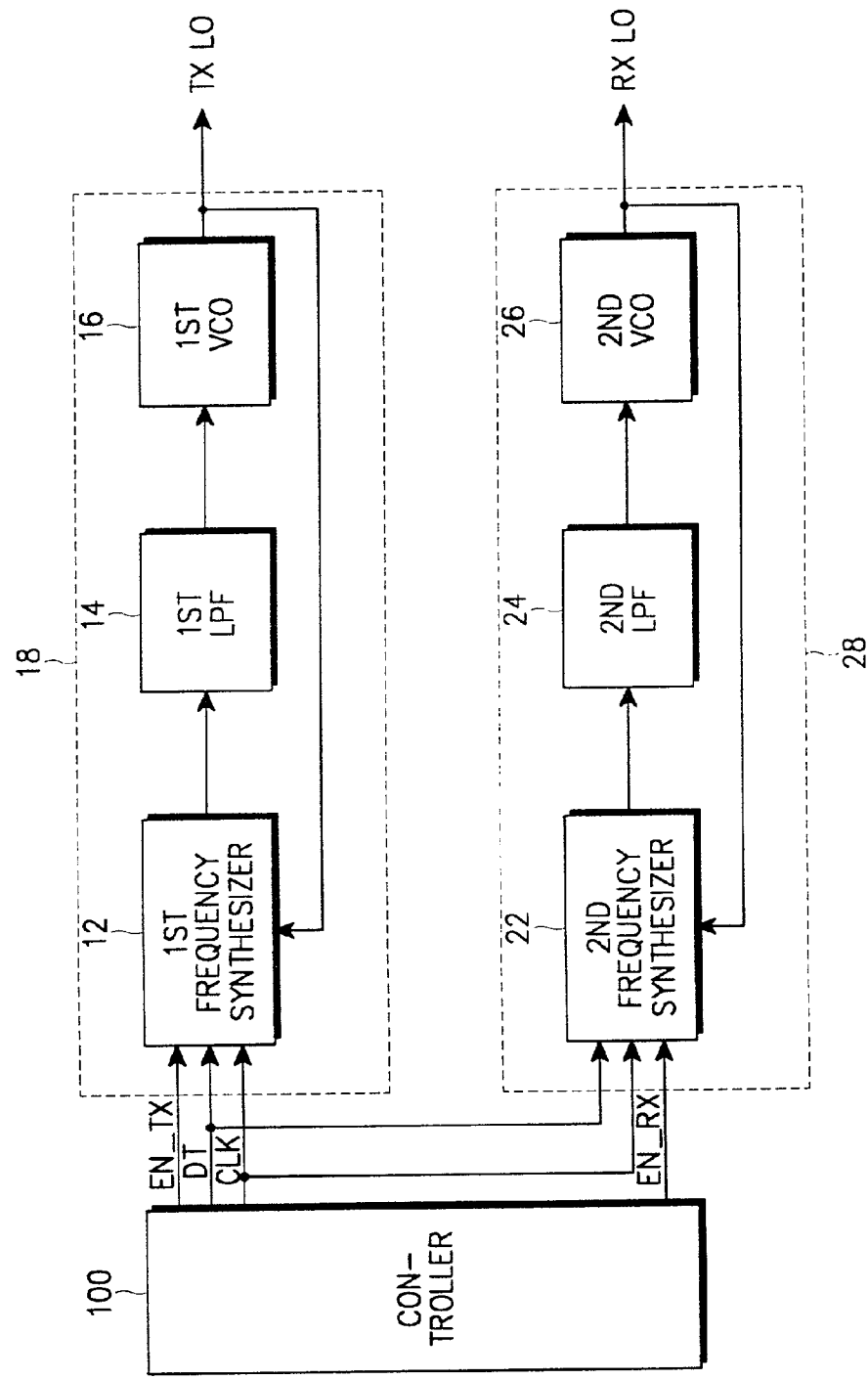
FIG. 4 is a block diagram of PLL blocks utilized to generate a TX local oscillation signal and an RX local oscillation signal, according to an embodiment of the present invention.

FIG. 3 is a block diagram of a typical mobile terminal and FIG. 4 is a block diagram of PLL blocks utilized to generate a TX local oscillation frequency and an RX local oscillation frequency, according to an embodiment of the present invention.

Referring to FIG. 3, there is a typical mobile terminal. The mobile terminal is comprised of a controller 100, a memory 102, a keypad 104, a display 106, an antenna 108, a RF (Radio Frequency) Module 110, a Baseband Processor 112, a CODEC (Coder-Decoder) 114, an amplifier 116, a microphone 118, a speaker 120, a ringer 122 and a vibrator 124. Controller 100 is connected to: memory 102, keypad 104, display 106, RF (Radio Frequency) module 110, baseband processor 112, CODEC (Coder-Decoder) 114 AND amplifier 16. In addition, controller 100 processes a normal telephone call or data communication and processes a voice signal and data for wireless Internet access, according to a corresponding protocol. Further, controller 100, instructs each component of the mobile terminal. The memory 102 includes a ROM (Read Only Memory), a flash memory, and a RAM (Random Access Memory). The ROM stores operation and control programs and data for the controller 100. The RAM provides a working memory for the controller 100. The flash memory provides an area for storing updatable data.

The keypad 104 has a plurality of keys including digit keys and provides a key input signal to the controller 100. The display 106 usually includes an LCD (Liquid Crystal Display), which, displays information under the control of the controller 100. The RF module 110 receives an RF signal from a base station via an antenna 108, then converts the received RF signal to an IF (Intermediate Frequency) signal, and outputs the IF signal to the baseband processor 112. The RF module 110 also converts an IF signal received from the baseband processor 112 and transmits the RF signal to the base station. The baseband processor 112 is a baseband analog application specific integrated circuit (BBA) that interfaces the controller 100 to the RF module 110. The baseband processor 112 converts a digital baseband signal received from the controller 100 to an analog IF signal. Then the baseband processor feeds the analog IF signal to the RF module 110. Baseband processor 112 also converts an RF signal to an analog IF signal received from the RF module 110 to a digital baseband signal, then feeds the digital baseband signal to the controller 100. The CODEC 114 is connected to a microphone 118 and a speaker 120 through amplifier 116. The CODEC 114 PCM (Pulse Code Modulation)—encodes a voice signal received from the microphone 118, then outputs the voice data to the controller 100.

CODEC 114 PCM-decodes voice data received from the controller 100, then outputs the voice signal to the speaker 120 via the amplifier 116. The amplifier 116 amplifies a received voice signal or a voice signal to be transmitted to the speaker 120 and adjusts the volume of the speaker 120 and the gain of the microphone 118 while under the control of the controller 100. A ringer 122 generates a bell sound under the control of the controller 100, and a vibrator 124, under the control of the controller 100, generates vibrations.

The RF module 110 includes a first PLL block 18, and a second PLL block 28 as shown in FIG. 4, according to the embodiment of the present invention. The controller 100 controls the PLL blocks 18 and 28.

Along with the recent trend of transmission of pictures and data, as well as voice transmission, multi-time slots are used in a data frame. Therefore, a gap between a transmission burst period and a reception burst period is narrowed. This implies that it is difficult to secure a PLL lock-up time required for a PLL to switch a TX local oscillation signal to an RX local oscillation signal. Unless the PLL lock-up time is secured, phase noise characteristics are deteriorated.

Since there is a limit in reducing the PLL lock-up time by use of a single PLL, the two PLL blocks 18 and 28 are provided in the embodiment of the present invention. By controlling the PLL blocks 18 and 28 with the controller 100, the PLL lock-up time is definitely secured.

Referring to FIG. 4, the first PLL block 18 generates a TX local oscillation signal to a radio transmitter and the second PLL block 28 generates an RX local oscillation signal to a radio receiver. The controller 100 instructs the first PLL block 18 to operate in a time shorter than a minimum time required for the PLL to lock up block 18 from the starting point of a transmission burst period. In addition, controller 100 instructs second PLL block 28 to operate in a time shorter than a minimum time required for the PLL block 18 to lock up from the starting point of a reception burst period.

Figure 1:
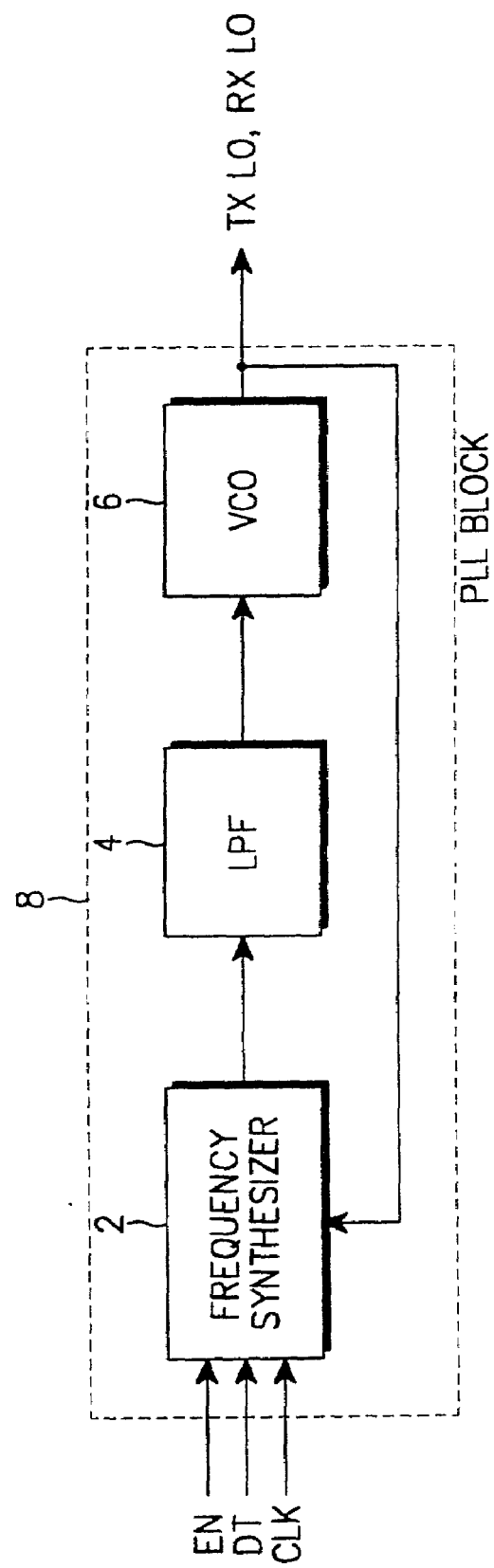
FIG. 1 is a block diagram of a PLL block utilized to generate a TX local oscillation signal and an RX local oscillation signal in a conventional mobile terminal.
Figure 2:
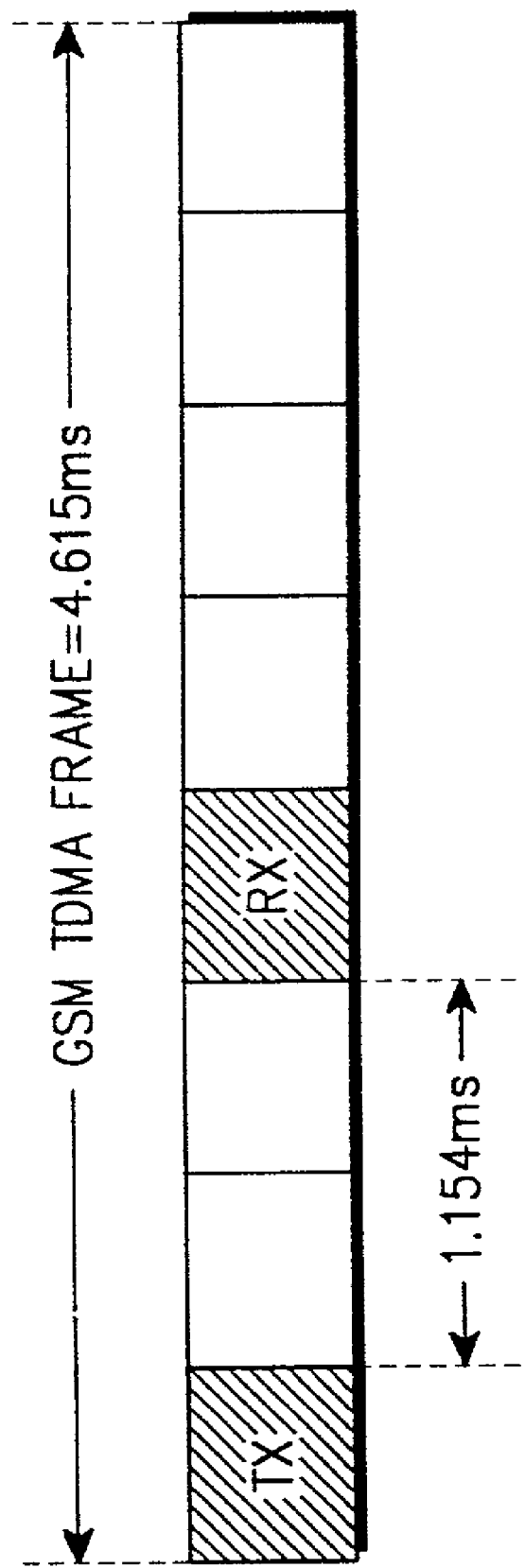
FIG. 2 illustrates the structure of a typical GSM TDMA frame.

A first frequency synthesizer 12, a first LPF 14, and a first VCO 16 in the first PLL block 18 and a second frequency synthesizer 22, a second LPF 24, and a second VCO 26 in the second PLL block 28 operate in the same manner as their counterparts in FIG. 1. Thus, the components of the first and second PLL blocks 18 and 28 are not described here.

The controller 100 applies a data DT and a clock signal CLK to both the first frequency synthesizer 12 and the second frequency synthesizer 22, according to the embodiment of the present invention. The controller 100 applies a transmission enable signal EN_TX to the first frequency synthesizer 12 and a reception enable signal EN_RX to the second frequency synthesizer 22.

FIG. 5 is an operational timing diagram of the transmission enable signal EN_TX, the reception enable signal EN_RX, the clock signal CLK, and the data DT provided by the controller 100, according to the embodiment of the present invention.

The operation of the PLL blocks, according to the embodiment of the present invention, will be described in detail referring to FIGS. 3, 4, and 5.

As shown in FIG. 5, the narrowest gap between a transmission burst period 30 and a reception burst period 32 by 9 symbols, is about 500 μsec. The 500 μsec gap is too short to be a PLL lock-up time. Therefore, the controller 100 controls the PLL blocks 18 and 28 to have a sufficient PLL lock-up time according to the embodiment of the present invention.

To do so, the controller 100 instructs the first PLL block 18 to operate before a minimum time P1 required for the first PLL block 18 to lock up from the start point, St, of the transmission burst period 30, that is, at a time point t1. Specifically, the controller 100 shifts the transmission enable signal EN_TX to an active low state, at the time point t1, and provides the clock signal CLK. The data DT corresponding to the frequency of a TX local oscillation signal, TX LO, is provided to the first PLL block 18 for a period when the transmission enable signal EN_TX is in the active logic low state. As a result, the first PLL block 18 generates the TX LO, in response to the data DT and the clock signal CLK. Even for the minimum time P1 required for the first PLL block 18 to lock up, the first PLL block 18 generates TX LO and provides it to the radio transmitter of the RF module 110. Since the radio transmitter is disabled in a non-transmission burst period, the generation of the TX LO for the time period P1 has no influence on the operation of the mobile terminal.

According to another embodiment of the present invention, the controller 100 instructs the first PLL block 18 to operate before the end point of the reception burst period 32, for example, near the time point t1.

To operate the second PLL block 28 with a sufficient PLL lock-up time, the controller 100 instructs the second PLL block 28 to operate before a minimum time P2 required for the second PLL block 28 to lock up from the starting point, Sr, of the reception burst period 32, that is, at a time point t2. Specifically, the controller 100 shifts the reception enable signal EN_RX to an active low state at the time point t2 and provides the clock signal CLK. The data DT corresponds to the frequency of an RX local oscillation signal RX LO is provided to the second PLL block 28 for a period when the reception enable signal EN_RX is in the active logic low state. As a result, the second PLL block 28 generates RX LO in response to the data DT and the clock signal CLK. Even for the minimum time P2 required for the second PLL block 28 to lock up, the second PLL block 28 generates RX LO and provides it to the radio receiver of the RF module 110. Since the radio receiver is disabled in a non-reception burst period, the generation of RX LO for the time period P2 has no influence on the operation of the mobile terminal.

It is further contemplated as another embodiment of the present invention that the controller 100 instructs the second PLL block 28 to operate before the end point of the transmission burst period 30, for example, in the vicinity of the time point t2.

As described above, the gap (e.g., 500 µsec) between the transmission burst period and the reception burst period and some time (e.g., α seconds) before the gap period are given as a PLL lock-up time so that a PLL has a sufficient lock-up time in the present invention. Hence, without increasing the PLL lock-up time, PLL phase noise characteristics can be optimized.

Table 1 shows the relationship between a PLL lock-up time and phase noise as measured in a mobile terminal for communication of voice, pictures, and data.

TABLE 1

| | test condition | | | unit |
|---|---|---|---|---|
| phase noise | frequency offset | 1.0 | −70 | −71.0 | dBc/Hz |
| | | 5.0 | −66.0 | −69.0 | |
| | | 12.5 | −71.0 | −78.0 | |
| | | 25.0 | −80.0 | −88.0 | |
| | | 50.0 | −90.0 | −98.0 | |
| | | 100 | −101.0 | −109.0 | |
| lock-up time | | | 500 | 800 | µsec |

As noted from Table 1, phase noise is very different, according to lock-up time 500 µsec and 800 µsec under the same conditions. It can be concluded that application of the present invention stabilizes the operation of a PLL block when phase noise characteristics do not come up to a specification, or a margin between the phase noise characteristics and the specification is not enough.

In accordance with the present invention as described above, a PLL can be lock up more steadfastly in a TDD mobile terminal, especially a mobile terminal requiring a short PLL lock-up time, and the mobile terminal can be designed such that the phase noise characteristics of a PLL block are reflected. While the conventional PLL scheme is limited in increasing a PLL lock-up time to satisfy a given phase noise specification due to the relation between the PLL lock-up time and phase noise, the PLL lock-up time can be increased without influencing phase noise characteristics.

While the invention has been shown and described with reference to certain preferred embodiments thereof, it will be understood by those skilled in the art that various changes in form and detail may be made therein without departing from the spirit and scope of the invention as defined by the appended claims.

What is claimed is:

1. An apparatus for generating transmission local oscillation signals and reception local oscillation signals in a mobile terminal, comprising:

a first phase locked loop (PLL) block configured to generate a transmission local oscillation signal;

a radio transmitter portion for receiving the transmission local oscillation signal;

a second PLL block for generating a reception local oscillation signal;

a radio reception portion for receiving the reception local oscillation signal; and a controller configured to control the first PLL block to operate before a minimum time period required for the first PLL block to lock up from the start point of a transmission burst period, to control the second PLL block to operate before a minimum time period required for the second PLL block to lock up from the start point of a reception burst period, to control the radio transmitter portion to operate only during a transmission burst period and to control the radio reception portion to operate only during a reception burst period.

2. An apparatus for generating a transmission local oscillation signal and a reception local oscillation signal in a mobile terminal, comprising:

a first PLL block configured to generate the transmission local oscillation signal;

a radio transmitter portion for receiving the transmission local oscillation signal;

a second PLL block configured to generate the reception local oscillation signal;

a radio reception portion for receiving the reception local oscillation signal; and a controller for controlling the first PLL block to operate before an end point of a reception burst period, for controlling the second PLL block to operate before an end point of a transmission burst period, for controlling the radio transmitter portion to operate only during a transmission burst period and for controlling the radio reception portion to operate only during a reception burst period.

3. A method of generating a transmission local oscillation signal and a reception local oscillation signal in a mobile terminal having a first PLL block for generating the transmission local oscillation signal and a second PLL block for generating the reception local oscillation signal, comprising:

controlling the first PLL block to operate before a minimum time period required for the first PLL block to lock up from the start point of a transmission burst period;

controlling a radio transmitter portion to operate only during a transmission burst period;

controlling the second PLL block to operate before a minimum time period required for the second PLL block to lock up from the start point of a reception burst period; and controlling a radio reception portion to operate only during a reception burst period.

4. The method of claim 3, further comprising:

applying the reception local oscillation signal generated from the second PLL block to a radio receiver for the reception burst period; and applying the transmission local oscillation signal generated from the first PLL block to the radio transmitter for the transmission burst period.

5. A method of generating a transmission local oscillation signal and a reception local oscillation signal in a mobile terminal having a first PLL block for generating the transmission local oscillation signal and a second PLL block for generating the reception local oscillation signal, the method comprising:

controlling the first PLL block to operate before the end point of a reception burst period;

controlling a radio transmitter portion to operate only during a transmission burst period;

controlling the second PLL block to operate before the end point of a transmission burst period; and controlling a radio reception portion to operate only during a reception burst period.

6. The method of claim 5, further comprising:

applying the reception local oscillation signal generated from the second PLL block to a radio receiver for the reception burst period; and applying the transmission local oscillation signal generated from the first PLL block to a radio transmitter for the transmission burst period.

* * * * *